United States Patent
Frankel et al.

(10) Patent No.: US 9,545,137 B2
(45) Date of Patent: Jan. 17, 2017

(54) FOLDABLE FRAME

(71) Applicant: Zenithen USA LLC, Diamond Bar, CA (US)

(72) Inventors: Andrew David Frankel, Yorba Linda, CA (US); Shi-Ping Zheng, Fuzhou (CN); Tian-Xia Zheng, Fujian (CN)

(73) Assignee: Zenithen USA, LLC, Diamond Bar, CA (US)

( * ) Notice: Subject to any disclaimer, the term of this patent is extended or adjusted under 35 U.S.C. 154(b) by 222 days.

(21) Appl. No.: 14/259,177

(22) Filed: Apr. 23, 2014

(65) Prior Publication Data

US 2015/0305295 A1    Oct. 29, 2015

(51) Int. Cl.
| | | |
|---|---|---|
| *A01K 1/00* | (2006.01) | |
| *B65D 25/00* | (2006.01) | |
| *A45C 7/00* | (2006.01) | |
| *A47B 43/00* | (2006.01) | |
| *A45C 13/04* | (2006.01) | |
| *A01K 1/03* | (2006.01) | |
| *B65D 37/00* | (2006.01) | |

(52) U.S. Cl.
CPC ............. *A45C 7/0036* (2013.01); *A01K 1/034* (2013.01); *A45C 13/04* (2013.01); *A47B 43/00* (2013.01); *B65D 37/00* (2013.01)

(58) Field of Classification Search
CPC ..... A01K 1/034; A45C 7/0036; A45C 7/0077; B65D 37/00; B65B 67/1205
USPC .................................... 119/514; 220/9.1–9.4
See application file for complete search history.

(56) References Cited

U.S. PATENT DOCUMENTS

| | | | | |
|---|---|---|---|---|
| 518,783 | A * | 4/1894 | Hudgin ................. | B65D 37/00 220/9.3 |
| 1,187,632 | A * | 6/1916 | Lane ..................... | B65D 37/00 220/9.2 |
| 1,187,749 | A * | 6/1916 | Lane ..................... | B65D 15/22 206/506 |
| 2,042,977 | A * | 6/1936 | Ahlmark ............... | B65D 33/02 220/9.3 |
| 2,224,537 | A * | 12/1940 | Cowan .................. | B65D 33/02 220/9.2 |
| 2,228,248 | A * | 1/1941 | Ahlmark ............... | B65D 37/00 220/9.3 |
| 2,785,724 | A * | 3/1957 | Gold .................... | B65D 33/02 220/9.2 |
| 3,306,329 | A * | 2/1967 | Braun ................... | B65D 7/26 220/756 |
| 2014/0353947 | A1* | 12/2014 | Frankel ................. | B62B 3/027 280/651 |
| 2015/0107526 | A1* | 4/2015 | Lemon ................. | A01K 1/034 119/499 |

\* cited by examiner

*Primary Examiner* — Kristen C Hayes
(74) *Attorney, Agent, or Firm* — Merek, Blackmon & Voorhees, LLC

(57) ABSTRACT

A foldable frame that can unfold into a complete open structure, and is convenient for converting into a storage container with an upward facing opening. The upper frame body and lower frame body are connected with the central pillars and support rods on both sides, and form a 6-pillar support structure at both ends of the frame, so that the frame can support more weight, realize multi-layer stacking or support other articles, such as desktop or seat surface.

5 Claims, 4 Drawing Sheets

FOLDABLE FRAME

TECHNICAL FIELD

The invention relates to a foldable frame, especially the foldable frame can be made into storage containers, multi-layer cabinets, suitcases, or pet boxes etc.

BACKGROUND ART

As is known, a foldable frame can be unfolded to provide a larger space, in order to accommodate more articles, and can be folded to a compact volume, so as to occupy less space for collection and handling. For example, CN100459904C shows a portable folding frame mechanism, comprising: a frame located on both sides of frame layer, wherein: at least two layers of frame are vertically arranged between the frame on both sides. The frame layer consists of two symmetrical frame plates connected together by way of split joint with hinge members. Hinge members of each upper frame and lower frame are connected at both ends by a connecting rod. Each layer of the frame is respectively hinged at both ends with the frame on both sides. The connecting rod is provided with a barrel connector consisting of a sleeve and support rods hinged on both sides of the sleeve. The sleeve of the sleeve connector is moveably covered on the connecting rod, and the support rod ends on both sides of the sleeve are hinged respectively with the frame on both sides. With the hinge joints composing the frame in each part, the frame can be easily folded to form a stable structure under the restriction/guidance of the connecting rod.

During handling, it is only necessary relatively to fold the back of the folding frame by gently lifting the frame with hands inserted into the handle hole in the central part of the top frame., and with the help of the hinge joint of two plates composing the folding frame, and driving both sides of the frame folding inwardly, thereby reducing its volume, and greatly facilitating storage and portability. This technology provides a concept of a folding frame, but the frame can only have opening on side face, thereby limiting the application of the frame. How to improve the weakness of the existing technology and design a frame with opening on side face and an open structure on top becomes an object of this invention.

SUMMARY OF THE INVENTION

The invention aims to provide a foldable frame consisting of an upper frame body and a lower frame body, which are hinged with two U-shaped rods, and supported with the help of central pillars and with support rods on both sides.

The technical scheme of the invention is realized as follows: a foldable frame, comprising an upper frame body, a lower frame body and central pillars, wherein the central pillars support the upper frame body and lower frame body at both ends of the frame. Where, the upper frame body and lower frame body are respectively hinged with the ends of two symmetrical or equivalent U-shaped rods, and the ends of two U-shaped rods of the said upper frame body and lower frame body are respectively hinged at the upper end and lower end of the central pillars. The said central pillar is equipped on either side with a support rod, both ends of which are respectively hinged with the U-shaped rods of the upper frame body and lower frame body. An inclined U-shaped rod is also provided between both ends of the frame, two its arms are respectively hinged on the support rod at both ends of the frame, and two of its ends are respectively hinged on sliding blocks of two central pillars. The sliding block is slidably covered on the central pillar, and when the frame is unfolded in place, the said sliding block is against the hinge joint of the U-shaped rod of the lower frame body and central pillar.

The said central pillar has a lamellar structure, and the ends of two U-shaped rods of the upper frame body and lower frame body are respectively hinged on the inner side of the upper end and lower end of the central pillars. The said central pillar is hinged with a central floor mat at least at its lower end. The said support rod is hinged on the inner side of the U-shaped rod. A side floor mat is hinged on the hinge joint of the support rod and U-shaped rod of the lower frame body, and is on the outer side of the U-shaped rod. The said central floor mat and ground touching end of the side floor mat are on the same horizontal plane.

The central pillar is hinged with an upper floor mat at the upper end, and the upper floor mat is equipped with a tenon on the upward end face. The central floor mat at the lower end of the central pillar is provided with a groove coinciding with the said tenon on the downward end face.

A handle is positioned on both sides of the said upper floor mat with hinge pins, is preferably as thick as the upper floor mat, and can upswing against two U-shaped rods of the upper frame body. A stop pin is respectively arranged on the outer edge of corresponding handle of the said U-shaped rod. When the handle upswings in place, the stop pin is set up between both sides of the handle, and forms a structure limiting the folding of two U-shaped rods of the upper frame body.

The support rod is hinged with a guide piece at the lower end. One end of the guide piece is hinged on the hinge joint of the support rod and U-shaped rod, and is on the outer side of the U-shaped rod, while the other end is hinged on the support rod. Inner side of the said floor mat is molded with a sinking trough to accommodate the guide piece. The guide piece put in the said sinking trough is hinged with the support rod, U-shaped rod and side floor mat.

Several greatest characteristics of the invention are that the upper frame body and lower frame body are hinged with two U-shaped rods, have complete molding, can unfold a complete open structure, and are convenient for converting into a storage container with an upward opening; the upper frame body and lower frame body are connected with the central pillar and support rods on both sides, and form a 6-pillar support at both ends of the frame, so that the frame can support more weight, realize multi-layer stacking or support other articles, such as desktop or seat surface. Moreover, both ends of the frame are connected with an inclined U-shaped rod and form a triangle, so as to avoid the weakness that four sides of the rectangle at both ends may move from side to side.

BRIEF DESCRIPTION OF THE DRAWINGS

This invention is further illustrated with specific drawings below.

Figure 1:
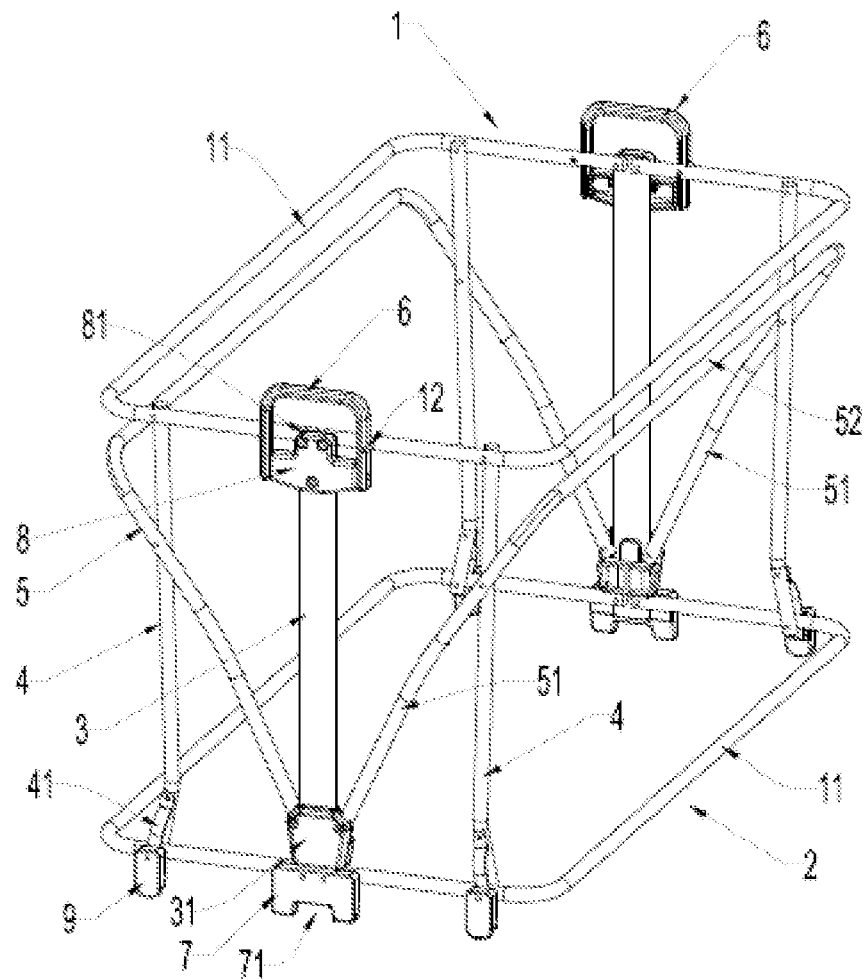
FIG. 1 is a perspective schematic diagram of the foldable frame.

Where, the following reference numerals are used in the drawings to indicate the following components:

1-upper flame body
11-U-shaped rod
12-stop pin
2-lower frame body
3-central pillar
31-sliding block
4-support rod
41-guide piece
5-inclined U-shaped rod
51-arm
52-U bottom segment
6-handle
7-central floor mat
71-groove
8-upper floor mat
81-tenon
9-side floor mat
91-sinking trough

DETAILED DESCRIPTION OF THE INVENTION

Figure 2:
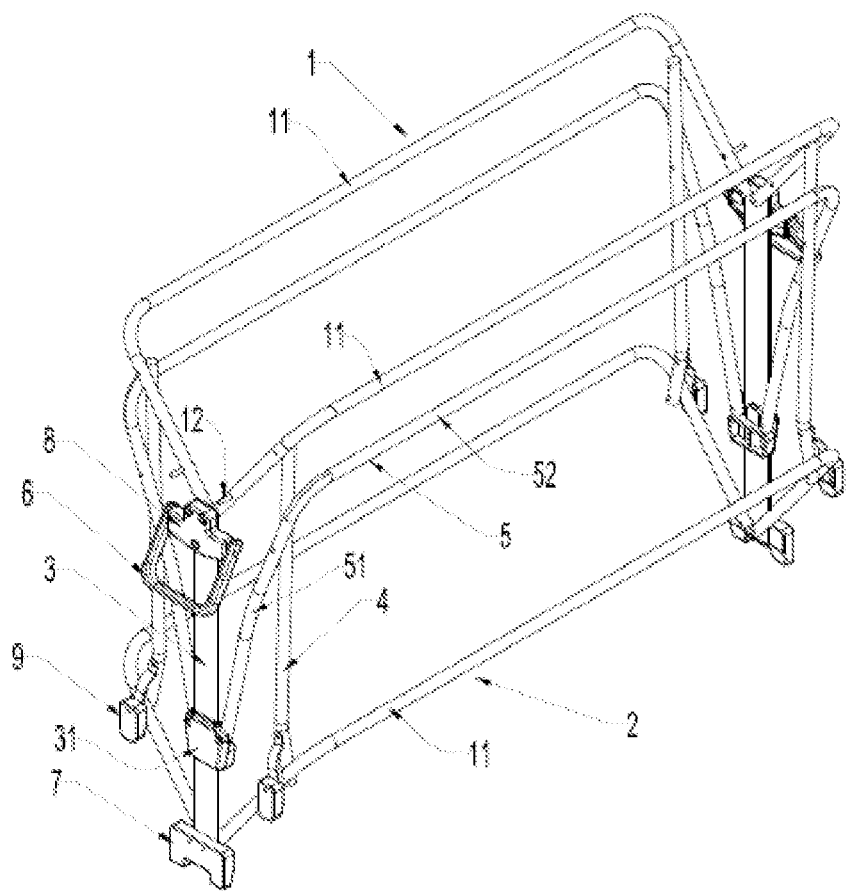
FIG. 2 is a schematic diagram of the folded foldable frame.
Figure 3:
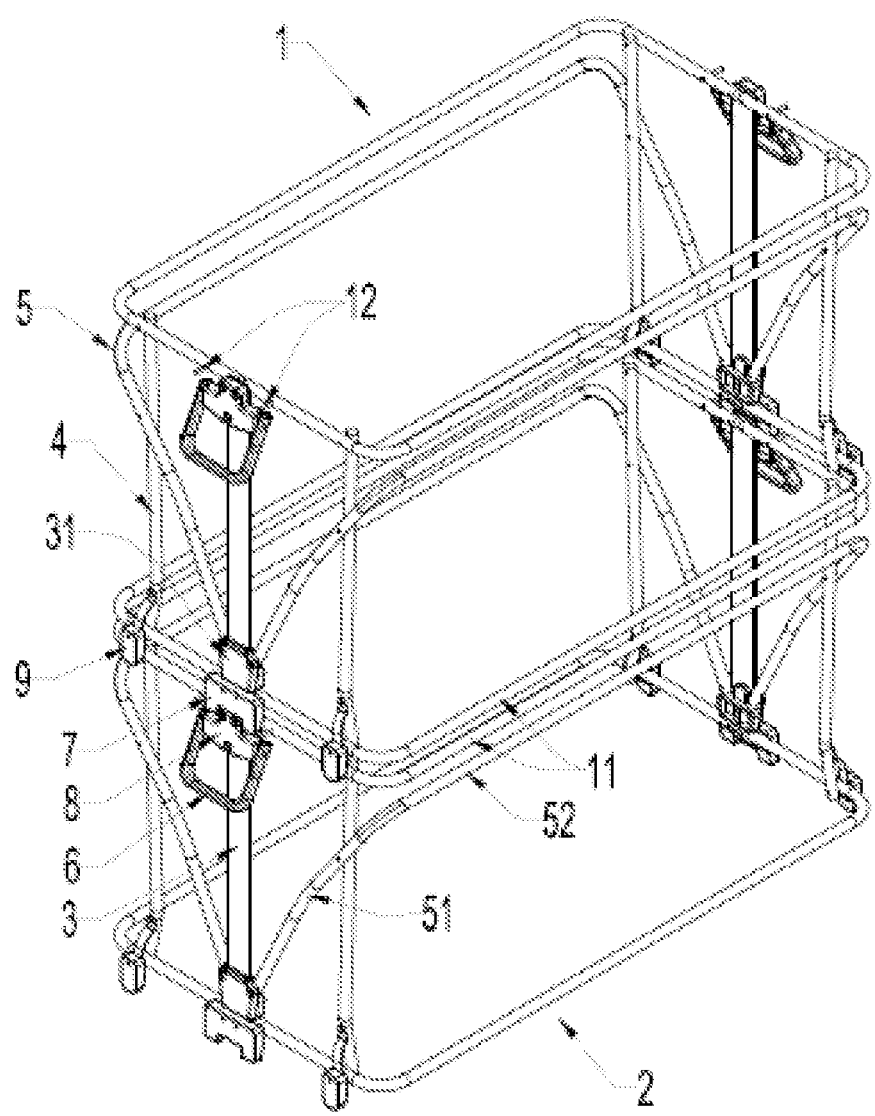
FIG. 3 is a schematic diagram of the stacked foldable frame.

As can be seen from FIGS. 1, 2 and 3, the foldable frame comprises an upper frame body 1, a lower frame body 2, central pillars 3, support rods 4 and an inclined U-shaped rod 5. The upper frame body 1 and lower frame body 2 are respectively hinged with the ends of two symmetrical or equivalent U-shaped rods 11. More specifically, the ends of two U-shaped rods 11 of the upper frame body and lower frame body are respectively hinged on the inner side at the upper end and lower end of the central pillar 3. The central pillar 3 has a lamellar structure, such as iron sheet or aluminum profile. The support rods 4 are located at both ends of the frame, are located on both sides of the central pillar 3, are parallel with the central pillar 3, are hinged at both ends with the U-shaped rods 11 of the upper frame body and lower frame body (this hinge joint is close to the bend of the U-shaped rod 11), are hinged on the inner side of the U-shaped rods 11, and form a 6-pillar support structure of the frame together with the central pillars 3, so that the frame can bear more weight and realize multilayer stacking or support other articles.

An inclined U-shaped rod 5 is also provided between both ends of the frame. Two arms 51 of the inclined U-shaped rod 5 are respectively hinged on the support rods 4 at both ends of the frame, and two of its ends are respectively hinged on sliding blocks 31 of two central pillars. U-bottom segment 52 of the inclined U-shaped rod 5 is connected at both ends of the frame, and can enhance the rigidity between both ends of the frame. Both arms 51, the support rods 4 and local U-shaped rod 11 of the lower frame body 2 form a triangular support so as to avoid the weakness of rectangle that moves from side to side by reinforcing the frame. The above sliding block 31 is slidably covered on the central pillar 3. When the frame is unfolded in place, the said sliding block 31 is against the hinge joint of the U-shaped rod of the lower frame body 2 and central pillar 3, thereby forming a force bearing support.

In addition, the central pillar 3 is hinged with a central floor mat 7 at the lower end, and an upper floor mat 8 at the upper end. A side floor mat 9 is hinged on the hinge joint of the support rod 4 and U-shaped rod of the lower frame body 2, and is on the outer side of the U-shaped rod 11. The central floor mat 7 and ground touching end of the side floor mat 9 are on the same horizontal plane to facilitate stable placement. Besides, when two frames are stacked together, the above side floor mat 9 can be placed against the edge of the upper frame body 2 of the lower frame to form a stable stacking relationship, as shown in FIG. 3.

Figure 4:
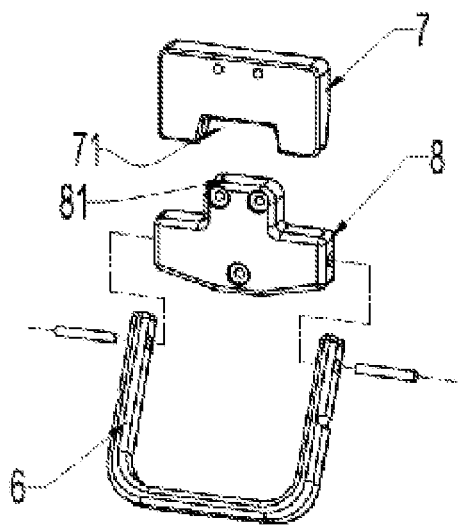
FIG. 4 is a schematic diagram of relationships between the central floor mat and upper floor mat.

As can be seen from FIG. 3 and FIG. 4, the upper floor mat 8 at the upper end of the central pillar 3 is equipped on the upward end face with a tenon 81. The central floor mat 7 at the lower end of the central pillar 3 is provided on the downward end face with a groove 71 coinciding with the said tenon 81. When two frames are stacked together, the central floor mat 7 of the upper frame is placed in the tenon 81 of the upper floor mat 8 of the lower frame with the help of the groove 71, so as to avoid left or right movement of the upper frame and lower frame. The central floor mat 7 cooperates with the above side floor mat 9 to form a stable stacking relationship between the upper frame and lower frame.

As can be seen from FIG. 4 and FIG. 1, a handle 6 is positioned on both sides of the upper floor mat 8 with hinge pins, is as thick as the upper floor mat 8, and can upswing against two u-shaped rods of the upper frame body 1. A stop pin 12 is respectively arranged on the outer edge of corresponding handle 6 of two U-shaped rods 11 of the upper frame body. When the handle 6 upswings in place, the stop pin 12 is set up between both sides of the handle 6, and forms a structure limiting the folding of two U-shaped rods of the upper frame body 1. As shown in FIG. 1, in this state, even if two U-shaped rods 11 of the upper frame body 1 are pulled with both hands, the frame cannot be folded. The handle 6 also facilitates moving the frame.

Figure 5:
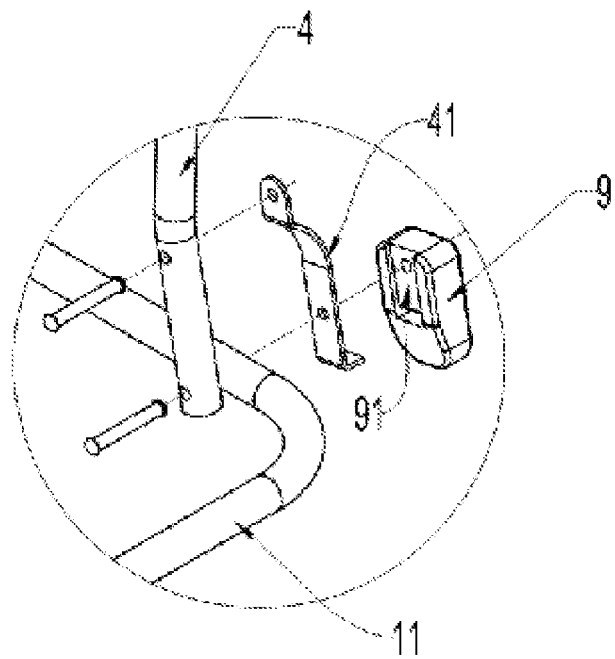
FIG. 5 is a schematic diagram of the relationships between the side floor mat and guide piece.

As can be seen from FIG. 5 and FIG. 1, the support rod 4 is hinged with a guide piece 41 at the lower end. One end of the guide piece 41 is hinged on the hinge joint of the support rod 4 and U-shaped rod 11, and is on the outer side of the U-shaped rod 11, while the other end is hinged on the support rod 4. Inner side of the said floor mat 9 is molded with a sinking trough 91 to accommodate the guide piece 41. The guide piece 41 put in the sinking trough 91 is hinged with the support rod 4, U-shaped rod 11 and side floor mat 9. Hence, it is easy to guarantee that the side floor mat 9 always keeps the design angle only with a hinge point, so as to prevent the side floor mat 9 from rotating in use, which affects balanced support.

As can be seen from FIG. 1-3, the foldable frame of the invention is covered with soft fabrics on its outer side, such as Oxford cloth or screen cloth, is designed with a zippered curtain on top or either side of the frame, can be used as a storage container or multilayer cabinet, a storage box for instance, can be multilayer stacked, can realize taking articles from side face, and is very convenient for use. As shown in FIG. 1, a single frame may be used, and can be designed into a pet box after wrapping it with screen cloth and with opening on side face. Or it may be directly covered with a cloth bag to form a storage tube with an upward opening, or be used as an emergency garbage can. It can also provide a seat for rest if a rigid cover is provided on its upper frame body, or to provide a temporarily surface for having meal, especially suitable for outdoor use, if it is covered with a desktop. It can form a small handcart if idler wheels are installed on its central floor mat and side floor mat. It can also form a foldable suitcase if a pull rod is installed on a central pillar of it. Hence, specific use cases may not have been provided one by one, but it may used for many purposes. All applications with the above frame structure or slightly distorted structure are anticipated and protected in the invention, and the invention is limited only by the claims provided.

We claim:

1. A foldable frame having a first and second end, comprising:
   an upper frame body and a lower frame body;
   a pair of central pillars, wherein one central pillar is provided on the first end of said foldable frame and the other respective central pillar is provided on the second end of said foldable frame and wherein each central pillar is connected to the upper frame body and said lower frame body;
   a sliding block slidably mounted on each of said pair of central pillars;
   said upper frame body comprising two U-shaped rods extending from the first end of the foldable frame to the second end of said foldable frame, wherein said two U-shaped rods of said upper frame body are hinged to an upper end of each of said central pillars;
   said lower frame body comprising two U-shaped rods extending from the first end of the foldable frame to the second end of said foldable frame, wherein said two U-shaped rods of said lower frame body are hinged to a lower end of each of said central pillars;
   a first and second support rod, wherein the first and second support rods are provided on opposite sides of one of said central pillars and wherein a first end of each of the first and second support rods is connected to said upper frame body and a second end of each of the first and second support rods is connected to said lower frame body;
   an inclined U-shaped rod having two arms, each of said two arms of said inclined U-shaped rod is respectively hinged on the support rod at the first and second ends of the frame; and each of said two arms of said inclined U-shaped rod is also respectively hinged to a one of the sliding blocks on a one of said central pillars at each of the first and second ends of the frame;
   wherein when said frame is unfolded in place, each of said sliding blocks is in a first position adjacent said lower frame body.

2. The foldable frame of claim 1, wherein, each of said central pillars has a lamellar structure, and the ends of said two U-shaped rods of said upper frame body and said two U-shaped rods of said lower frame body are respectively hinged on an inner side of the upper end and lower end of said central pillar;
   each of said central pillar is hinged with a central floor mat at a lower end of said central pillar;
   each of said support rods is hinged on the inner side of a respective U-shaped rod of said upper frame;
   at least one side floor mat is hinged on one of said support rods; and
   said central floor mat and said at least one side floor mat are on a same horizontal plane.

3. A foldable frame defined in claim 2, wherein, each of said central pillars is hinged with an upper floor mat at the upper end, and each of said upper floor mats is provided on an upward end face with a tenon; and
   a central floor mat at a lower end of each of said central pillars is provided on a downward end face with a groove coinciding with said tenon.

4. A foldable frame as defined in claim 3, wherein a handle is provided on two sides of said upper floor mat with a hinge pin;
   a stop pin is respectively arranged on an outer edge of said handle;
   wherein when said handle swings upwardly, said stop pin is set up between both sides of said handle, and forms a structure limiting the folding of two U-shaped rods of said upper frame body.

5. A foldable frame as defined in claim 2, wherein, each of said support rods is hinged with a guide piece at a lower end of the respective support rod;
   a one end of said guide piece is hinged on the respective support rod and a second end of said guide piece is hinged to a U-shaped rod of said lower frame body to form a hinge joint, wherein said guide piece is on an outer side of said U-shaped rod of said lower frame body;
   an inner side of said floor mat is molded with a sinking trough to accommodate said guide piece;
   said guide piece said sinking trough is hinged with said support rod, U-shaped rod and side floor mat.

* * * * *